Figure 1:
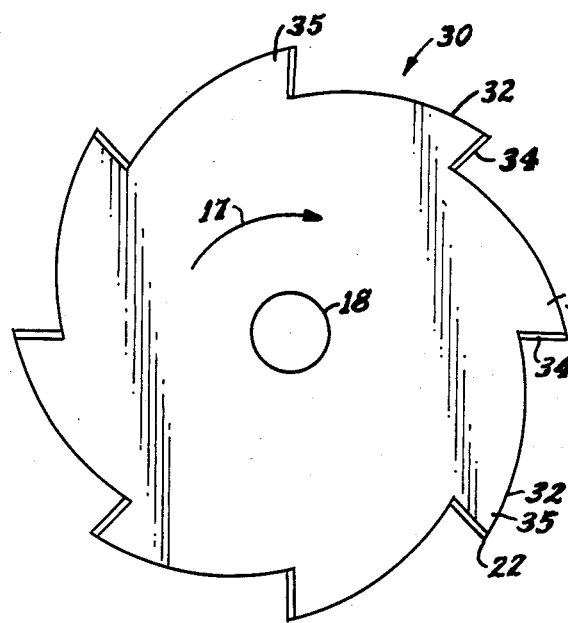

United States Patent [19]
Nichter

[11] Patent Number: 4,738,090
[45] Date of Patent: Apr. 19, 1988

[54] DEFLECTOR MEANS FOR CUTTER BLADES

[76] Inventor: Willard F. Nichter, 270 Vehslage Rd., Seymour, Ind. 47274

[21] Appl. No.: 506,694

[22] Filed: Jun. 22, 1983

[51] Int. Cl.$^4$ .................................. A01D 34/73
[52] U.S. Cl. ................................................ 56/295
[58] Field of Search ...................................... 56/295

[56] References Cited

U.S. PATENT DOCUMENTS

| | | | |
|---|---|---|---|
| 32,915 | 7/1861 | Reynolds | 56/295 |
| 402,301 | 4/1889 | Carpenter | 56/295 |
| 536,464 | 3/1895 | Friesz | 56/295 |
| 1,550,342 | 8/1925 | Cogley | 56/295 |
| 1,656,105 | 1/1928 | Durkee | 56/295 |
| 2,251,023 | 7/1941 | Orr | 56/295 |
| 2,427,265 | 9/1947 | Dreischerf | 56/295 |
| 2,598,091 | 5/1952 | Aligrim | 56/295 |
| 2,665,540 | 1/1954 | Dudley | 56/295 |
| 3,691,903 | 8/1972 | Phillips | 56/295 |
| 3,848,399 | 11/1974 | Makeham | 56/295 |
| 4,250,622 | 2/1981 | Houle | 56/295 |
| 4,310,999 | 1/1982 | Onoue | 56/295 |

Primary Examiner—Paul J. Hirsch
Attorney, Agent, or Firm—Robert A. Spray

[57] ABSTRACT

Deflector means for a generally circular cutter blade such as for the cutting of weeds, brush, or the like, which is mounted upon an associated power tool and power-driven thereby for rapidly revolving rotational movement, and having peripherally-spaced cutter teeth. The deflector means are provided rearwardly of the cutter edge of each tooth, and extend outwardly therealong as far as the most outermost portion of the cutter teeth, and extend rearwardly with respect to the cutter edge a significant distance sufficient that upon an engagement of a rigid object by the revolving cutter blade, the rigid object will be relatively deflected outwardly by the deflector means, and thus preventing engagement of the cutter tooth and the rigid object which would nick or otherwise damage the cutter tooth and/or its cutter edge, or which would cause other harm or accident.

1 Claim, 1 Drawing Sheet

DEFLECTOR MEANS FOR CUTTER BLADES

The present invention relates to circular cutter blades, or disks which are used for the cutting of weeds, brush, or the like, which are rotationally mounted upon an associated power tool, and which have peripherally-spaced cutter teeth.

More particularly, the invention relates to the provision of novel protection means for effectively preventing damage or accidents by the cutting edge of the blade's teeth encountering a rigid object or obstruction.

Such an encounter nicks or damages the teeth or their cutting edges; and the problem is aggravated by the fact that force being exerted by the user, in moving the power tool along the ground, causes a forceful shove of the tool against the object due to the cutter blade's cutting edge acting as a fulcrum when it encounters a rigid object or obstruction.

Accordingly, the present invention avoids the harm of such encounters and such problems, by providing a deflector means rearwardly of the cutter edge of each tooth, extending outwardly rearwardly of the tooth.

Thus protected, when there does occur an engagement of a rigid object or obstruction by the cutter blade disk, the rigid object will be relatively deflected by the disk's deflector means, relatively outwardly away from the cutter blade. Whether the deflected relative movement is by the object, if it is movable, or by the power tool itself, or both such movements, the damaging encounter of the cutter tooth's cutting edge and the rigid object is successfully avoided.

This of course, as a minimum, saves the cutting edge from an untimely need of re-sharpening; and saves a repair of a bent cutter disk; for such damages lessen cutting effectiveness by not only an effect of dulling the cutting edge but causing an inefficient extra drag upon the power tool.

The concepts provide that a cutter blade disk may be provided initially with such deflector means, or existing prior art cutter blade disks may be easily changed to provide such deflector means with scarcely noticeable impairment of the cutter blade disk's operativity in its usual service, i.e., when routinely accomplishing its intended task and when not encountering an obstruction.

Some protection of the cutting edges and of the cutter teeth, of rotary cutter disks, has been provided by the prior art; and it hardly seems necessary to mention that the problems of nicked cutter teeth or of cutter teeth edges have for many years been a bothersome problem, well-known to most all users of such equipment.

However, quite in contrast to the present concepts, the protection of the teeth and their cutter edges by the prior art has been by the provision of a stationary guard or shield carried by the associated device and located outwardly of the path of the cutter blade, thus serving as a protector from the blade in contrast to protection for the blade, i.e., a protection of the user's person and almost only incidentally as protective of the blade's cutter teeth and their cutting edges.

Although such prior art blade-protection, as provided by such a stationary outer guard or shield, often provides an adequate cutter-blade protection which is quite positive and is even more positive in some respects than that of the present invention, the prior art's stationary outer guards or shields have certain inherent and unavoidable disadvantages which are effectively overcome by the present invention's concepts of the provision of movable deflectors carried by the cutter blade itself and rearwardly of each tooth thereof.

More particularly, the disadvantages of the prior art's stationary outer guards or shields, which are overcome or avoided by the concepts of the present invention, are:

a. The prior art's disadvantage of the stationary outer guard or shield being an extra component, which as an extra component increases cost of the product and of the guard's mounting of the device, and adds some weight, etc.

b. The prior art's disadvantage of the stationary outer guard or shield being spaced from the outer limits of the cutting action path of the cutter teeth, which spacing prevents the tool from effectively cutting fully up to an obstruction, and thus requires the bother, time, and expense of an extra "finish trimming" procedure, which is either not necessary or at least greatly minimized by use of a cutter blade of the present invention; for, the blade carrying its own deflectors, and they preferably extending only as far outwardly as the outermost portion of the cutter edges of the teeth, the cutter blade disk of the present invention may be pushed fully into contact with an obstruction, and the cutter teeth edges thus be presented for cutting engagement with all weeds or the like, no matter how closely they are growing with respect to the obstruction.

The capability of cutting fully up to a rigid obstruction, even purposely touching the obstruction with the cutter blade so as to assure the full effectiveness of cutting fully up to the obstruction, without harm to the cutter disk, is particularly useful in situations as along fencing, up to trees, cemetery use around tombstones, along concrete or brick walls, up to wood or metal fenceposts, etc.

Even along chain link fences, which are perhaps the most troublesome of obstructions, the cutter disk of the present invention may be advantageously used, without nicking of the cutter teeth, by a slight slowing down of the speed the user moves the tool along the ground.

Yet, even though the present invention provides the very significant advantage of cutting fully up to these obstructions, without harm to the cutter disk, it performs the usual non-obstruction cutting task as good as prior art cutter disks, and much better than a prior art cutter disk which has been nicked or bent by encounters against the teeth of prior art cutters.

Figure 2:
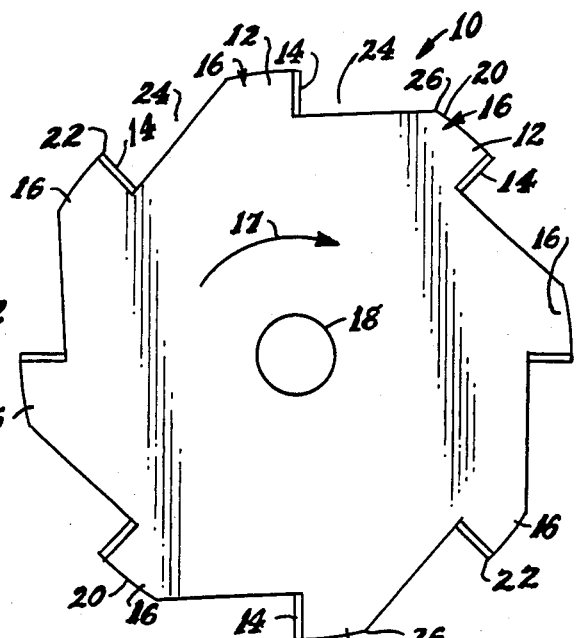
Figure 3:
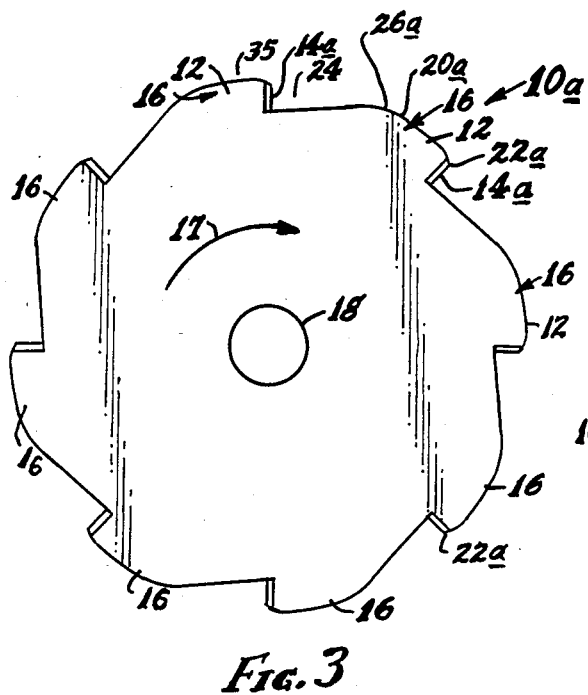
Figure 4:
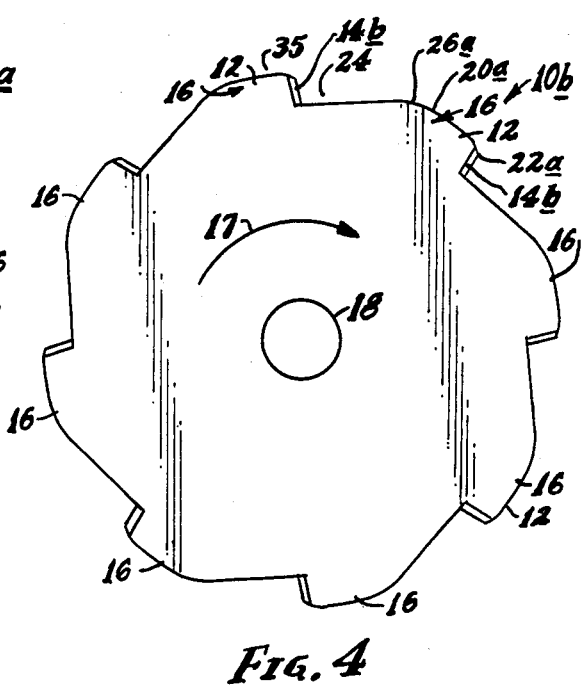

The above description is of somewhat introductory and generalized form. More particular details, concepts, and features are set forth in the following and more detailed description of illustrative embodiments taken in conjunction with the accompanying drawings, which are of somewhat schematic and diagrammatic nature, for showing of the inventive concepts and contrasting them with the prior art. In the drawings, FIG. 1 is a bottom plan view of a prior art cutter blade disk, FIG. 2 is a corresponding bottom plan view of a cutter blade disk of the present invention, in an embodiment in which the radial dimension of the cutter blade disk and cutter teeth are like that as for the prior art cutter blade of FIG. 1, but illustrating the novel deflector means as carried by the disk and teeth;

FIGS. 3 and 4 are similar bottom plan views of a cutter blade disk of the present invention, but with the deflector means shown as having been provided on the prior art cutter blade disk of FIG. 1, by cutting or otherwise removing outer material of the cutter teeth thereof; and the embodiments of these views shown as FIGS. 3 and 4 are different only with respect to the angle the cutter edge extends on the cutter teeth.

As shown in the drawings, the concepts provide a very economical and very durable cutter blade disk 10 for the cutting of weeds, brush, or the like, the blade disk 10 being of a type mountable on an associated power tool such as a weed cutter device. When mounted on the device, the cutter blade disk 10 is power-driven by the associated device for rapidly-revolving rotational movement.

As with prior art cutter blade disks, the cutter blade 10 of this invention is generally circular in form, and has peripherally-spaced cutter teeth 12, each of which is sharpened to have a cutter edge 14 facing the direction the teeth 12 are caused to move as powered of the associated tool; and, as in prior art cutter blades, the cutting of the weeds, brush, or the like, is by the cutting action of the cutting teeth edges 14 as the cutter disk 10 is rapidly rotated while the tool or device is being pushed along the ground.

According to the inventive concepts, such a cutter disk 10 is provided with means which protect the cutter teeth 12 and their cutter edges 14 from being nicked or otherwise damaged by encountering obstructions in use.

More particularly, the concepts of the invention provide deflector means 16 rearwardly of the cutter edge 14 of each tooth 12, the term "rearwardly" here having reference to the direction the teeth 12 are caused to move in the powered revolving movement of the cutter disk 10 as it is powered by the associated tool. Arrows 17 show the rotation.

It is to be particularly noted that the deflector means 16 extends outwardly, i.e., radially considered with respect to the center of rotation of the disk 10 as indicated by the mounting hole 18, such outer portion of the deflector means 16 being indicated by reference numeral 20, along that space rearward of the tooth's cutting edge 14 at least as far (radially considered) as the most outermost portion 22 of the cutter tooth 12, and extends rearwardly with respect to the tooth's cutter edge 14 a significant distance.

By the phrase "significant distance" as herein used, it is meant that the distance is sufficient, considering the speed of revolving rotational movement of the cutter blade 10 and the distance (peripheral) between cutter teeth 12, that upon engagement of a rigid object or obstruction by the cutter blade 10, while the cutter blade 10 is in its revolving rotational movement as powered by the associated power tool, the rigid object will be relatively deflected by the deflector means 16 relatively outwardly (radially considered) away from relative movement inwardly (radially considered) of the outer portions 20 of the deflector means 16, thereby preventing engagement of the cutter tooth 12 and the rigid object, such engagement being quite undesirable in that it would nick or otherwise damage the cutter tooth 12 and/or its cutter edge 14 and/or which would cause a relatively unyielding fulcrum which would cause a change in the direction of movement of the associated power tool, and/or which would cause other harm or accident.

It will be further noted, however, that the circumferential length (rearward of the tooth's cutter edge 14) of the deflector means 16 is nevertheless short enough (peripherally or circumferentially considered) that the length of the open or non-deflecting region 24 relatively behind the deflector means 16 is sufficiently long so as to accommodate a resilient spring-back, of the type of weeds, brush, or other material to be cut, so that the material to be cut will enter that non-deflecting region 24 and thus be cut by engagement therewith by the cutting edges 14 of the cutter teeth 12, even though more rigid objects or obstructions will be relatively deflected from the cutter teeth edges 14 by the deflector means 16.

In a desired embodiment, as shown, the deflector means 16 rearwardly of each tooth 12 extends rearwardly of the cutter edge 14 of the respective tooth 12 about one-third of the distance from the tooth's cutter edge 14 to the next adjacent tooth 12 rearward of the tooth 12 from which the particular deflector means 16 rearwardly extends.

Further in the desired embodiments shown, the deflector means 16 rearwardly of each tooth 12 extends rearwardly toward the next adjacent tooth 12 an amount sufficient to leave less than about two inches between (a) the most rearward portion 26 of the deflector means 16 which is disposed radially outwardly as far as the radially outermost portion 22 of the cutter edges 14 of the cutter teeth 12, and (b) the next adjacent tooth 12 rearward of the tooth 12 from which the particular deflector means 16 rearwardly extends.

Considering factors of the particular use, such as rotational speed of the drive shaft of the associated power tool and thus of the cutter disk 10, the diametric size of the disk 10, the number of teeth 12, and the usual speed by which the user would move the associated power tool along the ground, the deflector means 16 rearwardly of each tooth 12 extends rearwardly of the cutter edge 14 of the respective tooth 12 an amount such that if the associated tool be pushed toward the rigid object or obstruction generally in the usual speed of a manual task, the series of deflector means 16 successively encountering the rigid object or obstruction will keep in effect a continuing series of deflecting actuations, as successive deflector means 16 encounter the obstruction, and will thereby prevent the tool from being pushed close enough to the rigid object to permit the undesired engagement of the rigid object and the cutter teeth cutter edges 14.

As noted by comparison of the prior art cutter disk 30 and its teeth 32 of FIG. 1 with this invention's embodiment of the cutter disk 10 of FIG. 2, in such FIG. 2 embodiment the improvement resides structurally in the addition of the deflector means 16 to achieve its outer portion 20 extending rearwardly of the cutter edge 14 to its rearward portion 26, the cutter edge 14 of the FIG. 2 embodiment and the cutter edge 34 of the prior art cutter tooth 32 shown as FIG. 1 being radially equal and the outer portion 20 of the deflector means 16 of FIG. 2 also having that radial extent as far rearwardly as the deflector's rearward portion 26.

In the situation of the user already having a prior art cutter blade disk 30, the user may convert the blade 30 easily, i.e., he may achieve the cutter blade 10a of FIG. 3, by which he may readily achieve the concepts and advantages of the present invention, merely by grinding or otherwise cutting away a significant outer portion 35 of the cutter tooth 32 of the prior art's cutter disk 30, the cutting away being sufficient that the most rearward portion 26a of the tooth, which is outwardly as far (reference numeral 20a) as the outer portion 22a of the cutter tooth's front or cutter edge 14a, is a significant distance behind the cutter edge 14a as described above.

FIGS. 3 and 4 are optional embodiments with respect to the radial or non-radial direction of the cutter teeth's cutting edges, but such is not asserted as part of the present invention's inventive concepts. FIG. 3 shows the cutting edges 14a to be radial, whereas the cutting edges 14b of FIG. 4 are rearwardly inclined a few degrees from a radial line.

It is thus seen that a deflector means for rotary-powered cutting blades of devices for the cutting of weeds, brush, or the like, according to the inventive concepts herein set forth, provides a desired and advantageous improvement for cutter blades, yielding the advantages of a deflection means carried by the blade disk itself, particularly useful for ease of cutting close to any rigid obstruction, which, unless the blade's path be guarded by a shield which would hamper cutting close to the obstruction, would cause a harmful encounter of the blade edges and the obstruction. The concepts provide for their use as a new design for blades, but also as a means of easily changing a conventional blade; for the deflector means is provided desirably as an integral part of the blade disk itself.

Accordingly, it will thus be seen from the foregoing description of the invention according to these illustrative embodiments, considered with the accompanying drawings, that the present invention provides new and useful concepts of a novel and advantageous rotary cutter blade device with self-carried deflector means, having an economical formation, yielding desired advantages and characteristics for use and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. A generally circular cutter blade for the cutting of weeds, brush, or the like, for rotationally powered mounting upon an associated power tool, and being power-driven by the associated tool for rapidly revolving rotational movement, the cutter blade having peripherally-spaced cutter teeth each having a cutter edge facing the direction the teeth are caused to move by power of the associated tool upon which the cutter blade is mounted, the improvement for such a cutter blade, comprising:

the provision of deflector means rearwardly of the cutter edge of each tooth, having reference to the direction the teeth are caused to move in the cutter blade's said powered revolving movement as powered by the tool, the deflector means extending outwardly along that rearward space at least as far as the most outermost portion of the cutter tooth, and extending rearwardly with respect to the cutter edge a significant distance, the said significant distance being sufficient, considering the speed of revolving rotational movement of the cutter blade and the distance between cutter teeth, that upon an engagement of a rigid object by the cutter blade, while the cutter blade is in its revolving rotational movement as powered by the associated power tool, the rigid object will be relatively deflected by the deflector means, relatively outwardly away from relative movement inwardly of the outer portions of the deflector means, thereby preventing engagement of the cutter tooth and the rigid object which would nick or otherwise damage the cutter tooth and/or its cutter edge, and/or which would cause a relatively unyielding fulcrum which would cause a change in the direction of movement of the associated power tool, and/or which would cause other harm or accident, yet, nevertheless, the circumferential length of the deflector means is short enough that the length of the non-deflecting region relatively behind the deflector means is sufficiently long so as to accommodate a resilient spring-back, of the type of weeds, brush, or other material to be cut, so that the material to be cut will enter that non-deflecting region and thus be cut by engagement therewith by the cutting edges of the cutter teeth, even though more rigid objects will be relatively deflected from the cutter teeth edges as aforesaid;

in a combination in which the deflector means rearwardly of each tooth extends rearwardly of the cutter edge of the respective tooth about one-third of the distance from the tooth's cutter edge to the next adjacent tooth rearward of the tooth.

* * * * *